Dec. 30, 1969  H. A. BARON  3,486,574
DRIVE MECHANISM FOR CRAWLER TRACKS
Filed June 26, 1968  2 Sheets-Sheet 1
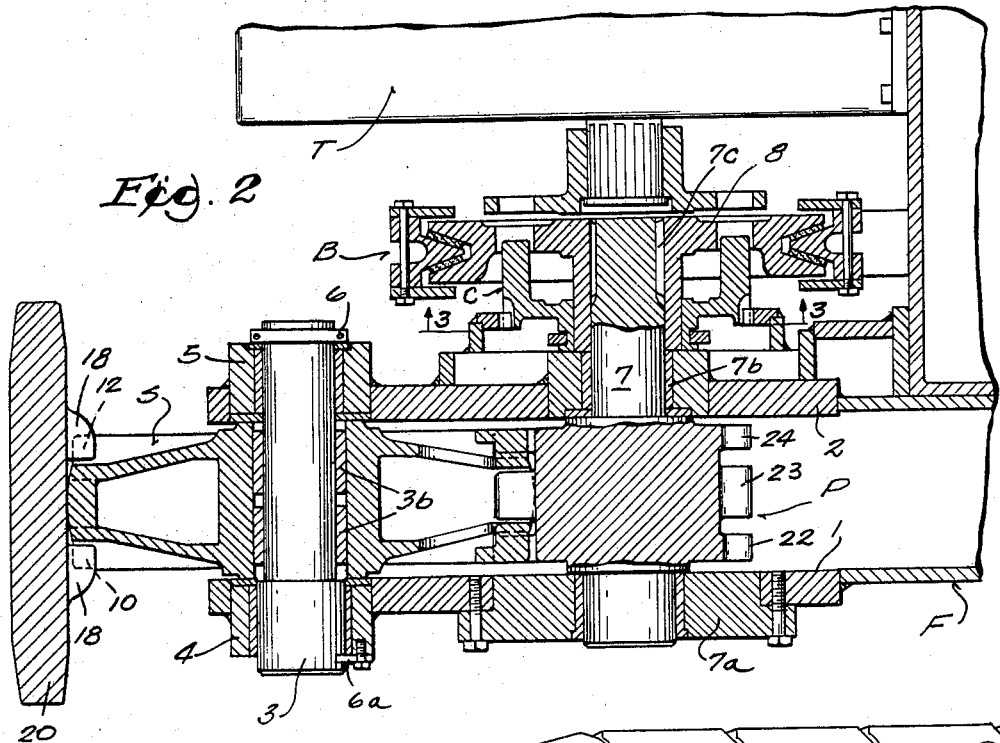
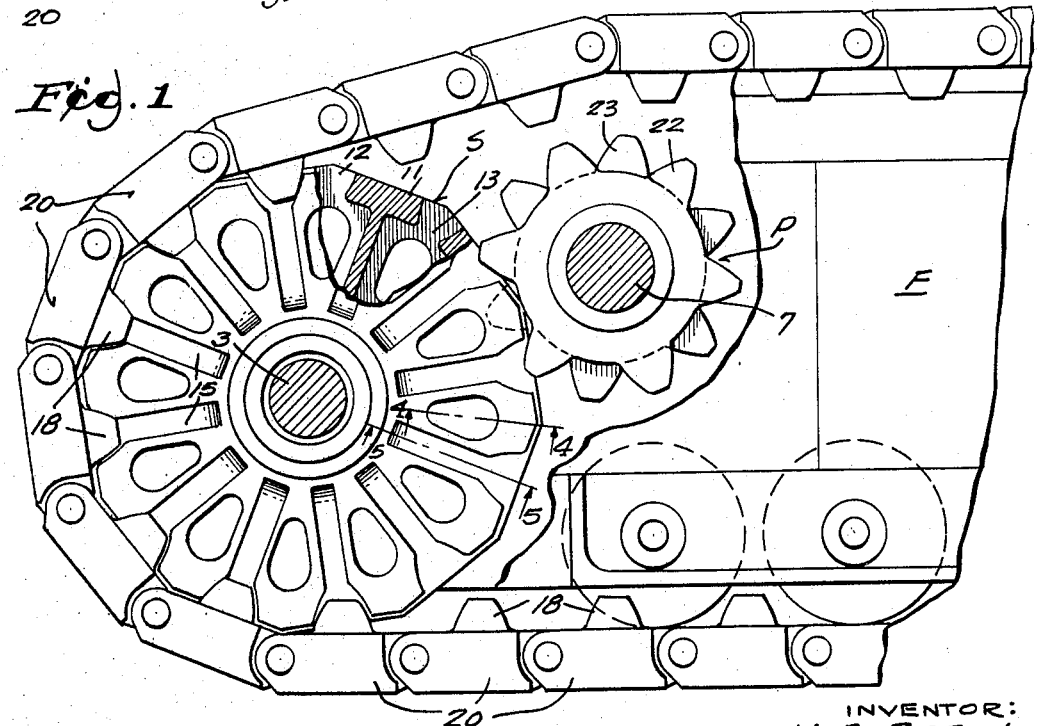
INVENTOR:
H. A. BARON
BY: James E. Nilles
ATTORNEY Dec. 30, 1969  H. A. BARON  3,486,574
DRIVE MECHANISM FOR CRAWLER TRACKS
Filed June 26, 1968  2 Sheets-Sheet 2
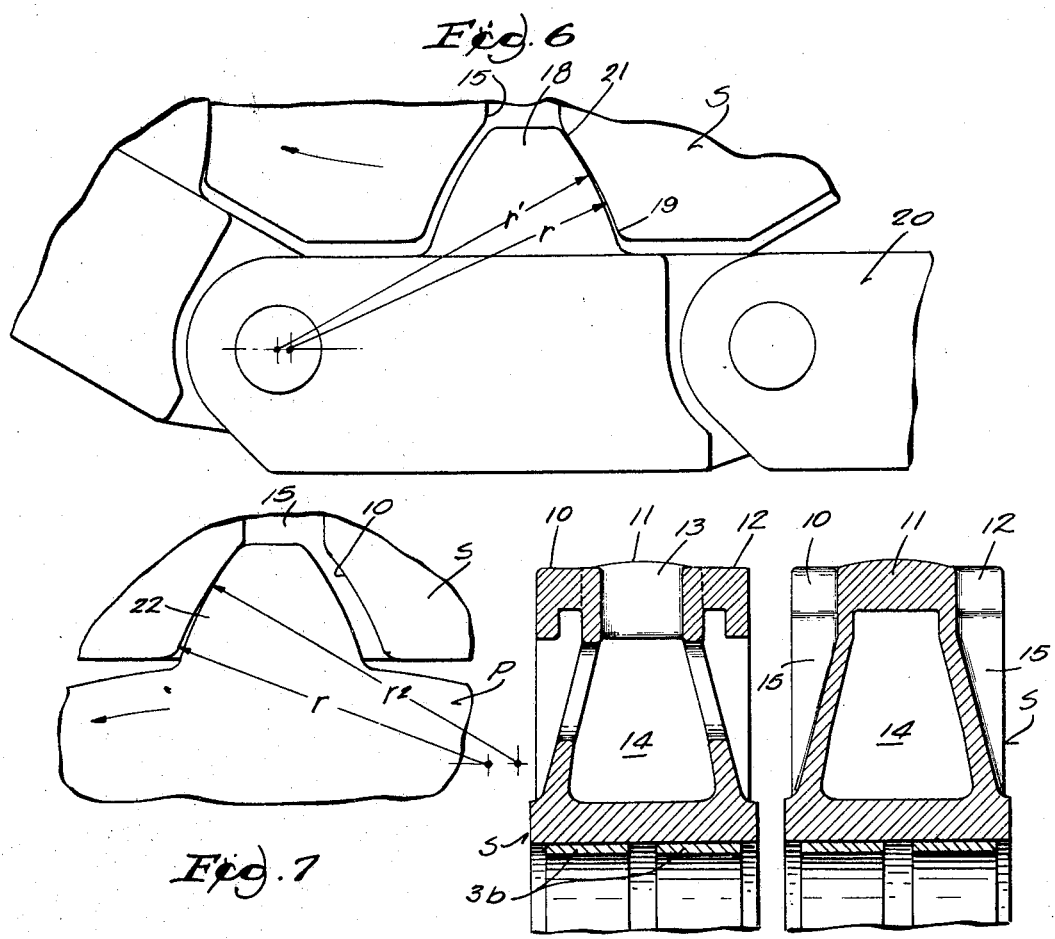
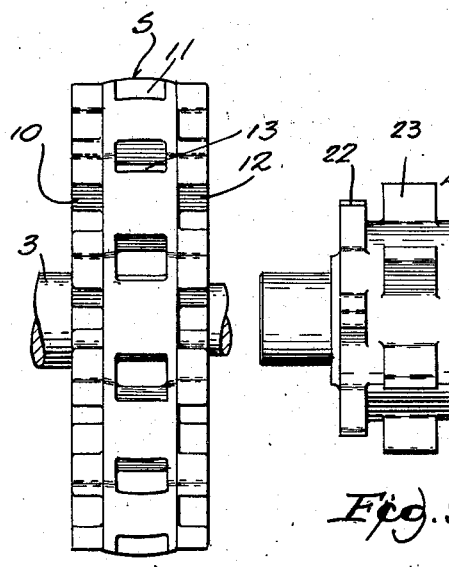
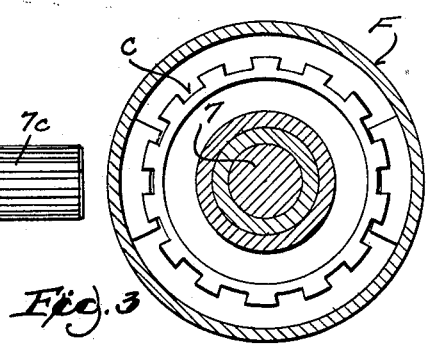
INVENTOR:
H. A. BARON
BY: James E. Nilles
ATTORNEY United States Patent Office 3,486,574
Patented Dec. 30, 1969

3,486,574
DRIVE MECHANISM FOR CRAWLER TRACKS
Henry A. Baron, Greendale, Wis., assignor to Harnischfeger Corporation, a corporation of Wisconsin
Filed June 26, 1968, Ser. No. 740,257
Int. Cl. B62d 55/00, 55/08, 25/16
U.S. Cl. 180—9.62
4 Claims

ABSTRACT OF THE DISCLOSURE

Drive means for driving the endless track of a crawler, such as on a shovel. A driven sprocket having three rows of circumferentially staggered teeth, the two outer rows of sprocket teeth engaging two rows of track link lugs, and a driver pinion driving the periphery of the sprocket by engaging all three rows of special profile, circumferentially staggered teeth.

BACKGROUND OF THE INVENTION

The invention pertains to motor vehicles having ground engaging endless tracks or treads made up of a series of links, and more particularly to the drive means for the tracks, which drive means includes a large sprocket which engages the links, and a pinion which engages the periphery of the sprocket. A device of this general character is disclosed in the U.S. Patent 674,737 of May 21, 1901.

Other prior drives are arranged so the pinion drives an internal gear of the sprocket, such as in the U.S. Patent 1,318,008 of Oct. 7, 1919. Still another example is U.S. Patent 3,056,633 of Oct. 2, 1962 wherein the sprocket is driven from one end of the shaft on which it is mounted.

SUMMARY OF THE PRESENT INVENTION

The present invention provides a drive mechanism for an endless track of a vehicle in which a special sprocket having three rows of circumferentially staggered teeth is used to drive the track, and which sprocket is driven by a pinion engaging its periphery. Two of the rows of sprocket teeth engage the track link lugs at laterally spaced locations to provide good stability, and all three rows of sprocket teeth are engaged by complementary disposed and profiled teeth of the driver pinion. With the present drive mechanism, particularly positive and smooth driving engagement is provided. Good gear contact and engagement ratio is provided between the track and sprocket, and between the sprocket and pinion. The profile and configuration of the three rows of circumferentially staggered teeth are such that smooth and full gear tooth contact is assured regardless of foreign matter accumulation, and the sprocket and pinion can be disassembled and reversed side-for-side so as to double the wear life thereof.

These and other objects and advantages of the present invention will appear later as this disclosure progresses.

BRIEF DESCRIPTION OF THE DRAWINGS

FIGURE 1 is fragmentary, side elevational view of a track drive embodying the present invention, certain parts being shown as broken away, in section, or removed for clarity;

FIGURE 2 is a plan view of the drive shown in FIGURE 1, certain parts being broken away or in section;

FIGURE 3 is a sectional view taken along line 3—3 in FIGURE 2;

FIGURES 4 and 5 are sectional views taken along line 4—4 and 5—5, respectively, in FIGURE 1, but on an enlarged scale;

FIGURE 6 is an enlarged fragmentary view of a portion of the track and sprocket as shown in FIGURE 1;

FIGURE 7 is a fragmentary view of a portion of the FIGURE 1 showing and illustrating the pinion tooth in driving engagement with the sprocket tooth;

FIGURE 8 is an elevational view of the sprocket; and

FIGURE 9 is an elevational view of the pinion and its shaft.

DESCRIPTION OF THE PREFERRED EMBODIMENT

The present invention finds particular utility in large earth working or mining machinery such as electric shovels which use several endless tracks, at least one on each side to propel and steer the machine. For purposes of illustrating the present invention, the drive mechanism for only one of said tracks will be shown and described.

Only a portion of the machine frame F is shown and usually consists of particularly heavy weldments, including two spaced apart and parallel frame members 1 and 2.

A driver pinion P is in constant mesh with a sprocket S at the periphery of the latter, that is, with the external teeth of the sprocket to be described. The pinion is mounted by its shaft 7 in members 1 and 2 and is driven from a power source (not shown) on the vehicle through a transmission T, brake B and clutch C. Thus the pinion and sprocket may be driven in either direction of rotation.

The pinion shaft 7 is journalled in the bushing carrier 7a removably held in frame member 1, and in bushing 7b fixed in frame member 2. The shaft 7 has a splined section 7c by which it is removably connected to a brake member 8. Thus, the pinion and its shaft can be removed axially outwardly from the frame after bushing carrier 7a has been removed, and installed on the opposite side of the machine.

The sprocket S provided by the present invention is rotatably mounted on bushings 3b to shaft 3, and shaft 3 is journalled in a suitable pair of bushings 4 and 5 fixed in frame members 1 and 2 respectively. By removing the collar 6 and lock plate 6a, the shaft can be axially withdrawn in an outward direction from the frame, and the sprocket then removed for reversal. Thus, the sprocket wear life is doubled.

The sprocket S has three rows of teeth 10, 11 and 12, the teeth of the outer two rows 10 and 12 being in axial alignment with one another, but circumferentially staggered with respect to the center row 11. The teeth of the center row are also about twice the width than the teeth of rows 10 and 12. The sprocket is substantially hollow, the space 13 between the teeth in the row 11 being in communication with the inside 14 of the sprocket.

It will be noted that the sprocket teeth are formed on each side of their radially outermost edge as a radius $r$, as clearly shown in FIGURE 6. In other words, the sides of the teeth are formed as a concave surface. It will furthermore be noted that a radially, inwardly extending recess 15 is located between the teeth of the outer rows 10 and 12. These recesses provide relief against the accumulation of material, such as mud which would otherwise be compacted between the teeth by the action of the track lugs to be presently referred to.

Thus the above sprocket is particularly wide or of considerable axial length, and is more in the nature of a tumbler or drum than a conventional sprocket.

The sprocket S engages lugs 18 which are formed on the pivotally connected links. 20. Stated otherwise, the two outer rows of teeth 10 and 12 engage the lugs 18 of the crawler shoes or links 20, thereby providing good driving contact and lateral stability. The lugs 18 are formed on a radius r', (FIGURE 6) which is different from radius r of the rows of teeth 10 and 12, as shown in FIGURE 6, this provides a wider clearance between the teeth at the base of lugs 18, as at 19, than at the crown of the lugs 18, as at 21, and insures smooth engagement, without binding, between lugs 18 and rows of teeth 10 and 12. In other words, as the lug enters the space between the sprocket teeth, any foreign matter is not trapped at the root of the sprocket teeth but instead can be forced out from between the sprocket teeth as the lug makes contact first with its outermost portion or crown The result is a good rolling contact between the lugs and teeth to provide a smooth and positive drive therebetween.

The pinion P has three rows of teeth 22, 23 and 24 which mesh respectively with the sprocket rows of teeth 10, 11 and 12. The teeth in the center row are about twice as wide as the side row teeth, and are circumferentially between the side row teeth. The teeth of the pinion are formed with curved surfaces formed by radius r2 as shown in FIGURE 7, thus meshing smoothly and without binding, with the teeth of the sprocket.

By having a plurality of rows of staggered teeth on the sprocket and pinion, a very high contact and engagement ratio is provided between the pinion and sprocket. The center row of teeth are circumferentially offset from the outer rows by one-half a pitch and with these staggered teeth of special profile and configuration, there is always more than one tooth in engagement and a positive and smooth drive is always assured.

It will be noted that the center row of sprocket teeth are also at a greater diameter than its two side rows of teeth, and the track links ride primarily on these center teeth around the sprocket periphery, as shown clearly in FIGURE 2.

What is claimed is:

1. Drive mechanism for endless track links having laterally spaced lugs, said mechanism comprising, a sprocket a pinion in driving relationship with said sprocket; said pinion and said sprocket each having a pair of outer rows of teeth and also each having a center row of teeth around its periphery, the teeth of said center row being circumferentially offset from the teeth of said outer rows, all three rows of sprocket teeth meshing with all three rows of pinion teeth; and the pair of outer rows of teeth on said sprocket drivingly engaging said link lugs.

2. In a vehicle having ground engaging, endless tracks of the pivoted link type, said links having a pair of laterally spaced lugs thereon, drive mechanism for said links comprising, a sprocket rotatably mounted on said vehicle and within each of said endless tracks, a pinion rotatably mounted on said vehicle in driving relationship with said sprocket; said pinion and said sprocket each havnig a pair of outer rows and also a center row of teeth around its periphery, the teeth of said center row being circumferentially offset from the teeth of said outer rows, all three rows of sprocket teeth meshing with all three rows of pinion teeth; and the pair of outer rows of teeth on said sprocket drivingly engaging said link lugs.

3. In a vehicle having ground engaging, endless tracks of the pivoted link type, said links having a pair of laterally spaced lugs thereon, drive mechanism for said links comprising a sprocket rotatably mounted on said vehicle and within each of said endless tracks, a pinion fixed to a drive shaft, said shaft being rotatably mounted on said vehicle for placing said pinion in constant driving mesh with said sprocket; a clutch and brake driving engageable with one end of said drive shaft, and means for journalling said shaft in said frame for removal therefrom in an axial direction; said pinion and said sprocket each having a pair of outer rows and also a center row of around its periphery, the teeth of said center row being circumferentially offset from the teeth of said outer rows, all three rows of sprocket teeth meshing with all three rows of pinion teeth; and the pair of outer rows of teeth on said sprocket drivingly engaging said link lugs.

4. A crawler type vehicle having ground engaging, endless tracks of the pivoted link type, said links having a pair of laterally spaced lugs thereon, drive mechanism for said links comprising, a sprocket rotatably mounted on said vehicle and within each of said endless tracks, a pinion rotatably mounted on said vehicle in driving relationship with said sprocket; said pinion and said sprocket each having a pair of outer rows of teeth and also having a center row of teeth around its periphery, the teeth of said center row being circumferentially offset from the teeth of said outer rows, all three rows of sprocket teeth meshing with all three rows of pinion teeth; and the pair of outer rows of teeth on said sprocket drivingly engaging said link lugs, the sides of the teeth of the outer rows of teeth of said sprocket being formed as a concave surface, and the teeth of said outer rows of said pinion are shaped to bear against the radially inner end of said concave surfaces prior to bearing against the outer end of said surfaces to thereby insure mesh of the teeth without binding therebetween.

References Cited

UNITED STATES PATENTS

| 1,494,807 | 5/1924 | Rorabeck | 305—57 |
| 1,804,816 | 5/1931 | Shelton | 305—57 X |

FOREIGN PATENTS 847,367 6/1939 France.

RICHARD J. JOHNSON, Primary Examiner

U.S. Cl. X.R.

74—229; 305—13, 57